United States Patent
Cunningham

(10) Patent No.: US 6,173,320 B1
(45) Date of Patent: Jan. 9, 2001

(54) VISUAL FEEDBACK FOR INSTALLATION OF EQUIPMENT

(75) Inventor: Randy Mark Cunningham, Roseville, CA (US)

(73) Assignee: Hewlett-Packard Company, Palo Alto, CA (US)

(*) Notice: Under 35 U.S.C. 154(b), the term of this patent shall be extended for 0 days.

(21) Appl. No.: 09/075,465

(22) Filed: May 8, 1998

(51) Int. Cl.[7] .................................................. G06F 15/177
(52) U.S. Cl. ........................... 709/220; 709/208; 714/46; 340/815.47; 713/1
(58) Field of Search .......................... 713/1; 340/815.47; 709/208, 220; 714/46

(56) References Cited

U.S. PATENT DOCUMENTS

| | | | |
|---|---|---|---|
| 3,887,913 | * 6/1975 | Smith | 340/381 |
| 5,119,489 | * 6/1992 | Bond et al. | 395/575 |
| 5,315,711 | * 5/1994 | Barone et al. | 395/275 |
| 5,647,056 | * 7/1997 | Barrett et al. | 395/200.1 |
| 5,687,315 | * 11/1997 | Tezuka et al. | 395/275 |

* cited by examiner

*Primary Examiner*—Ly V. Hua
*Assistant Examiner*—Robert G. Crockett

(57) ABSTRACT

Feedback is provided to a user during installation of electronic equipment. Prior to installation of the electronic equipment, a plurality of installation feedback lights are placed on a case of the electronic equipment. During installation of the electronic equipment after attempting performance of an installation step, a determination is made as to whether performance of the installation step was successful. When performance of the installation step was successful, notification is provided to an installer that the installation step was successful. The notification includes activating one of the installation feedback lights.

21 Claims, 4 Drawing Sheets

VISUAL FEEDBACK FOR INSTALLATION OF EQUIPMENT

BACKGROUND

The present invention concerns installation and configuration of equipment and pertains particularly to visual feedback given when installing equipment.

For many users of equipment such as computer equipment, computer peripherals and networking systems, installation of the equipment can often be a time-consuming and frustrating endeavor. This can be especially true when equipment from different vendors is networked together. If the installation fails, it is often difficult to identify whether the failure results from defective equipment, incompatible equipment or faulty installation.

For example, when installing a network print server into a local area network (LAN), verification of correct installation and configuration of the printer server is generally accomplished by sending a test print job from a computer, connected to the LAN, through the LAN to a printer attached to the network print server. Successful printing of the print job verifies that installation and configuration is successful.

A disadvantage to this method of verifying correct installation and configuration of the printer server is that there is no feedback to the user until installation and configuration has been (or at least is thought to be) completed. Additionally, the feedback is, in a sense, all or nothing. If there is a failure, there is generally no indication why the failure took place. Troubleshooting, therefore, can be frustrating and difficult for a user.

Another method used to confirm status of a network print server is to manually press a button on the network print server to request a configuration page be printed from the attached printer. The configuration page typically contains information about hardware self-test status, network connection status and software configuration.

While this can sometimes be useful when troubleshooting a failed installation, this method still has some disadvantages. For example, when a user is performing an installation, there are many installation steps which do not change the status of the printer server and thus does not change the information printed on the configuration page. Thus even if a user uses this feature to monitor installation, the feedback could be misleading because the user might not be able to detect a change in status as the result of performing a particular installation step. In addition, the user would generally have to read the manual in order to recognize the existence of this feature and for information about how to correctly activate the feature.

Another method used to confirm status of a network print server is to utilize a software utility that displays status of configuration of the network print server on the network. Such a software utility would run on a computer attached to the local area network.

One disadvantage of such a software utility is that the network print server has to be properly configured to the network before the software utility can access the printer server for status information. Additionally, until a printer has been properly installed, the software utility is unable to provide a hard copy of any information to a user. When there is no printer available, the software utility can only provide status and error information on a terminal screen. Any useful error information to a user is temporary and generally ceases to be displayed as soon as a user acknowledges "OK" and thereby closes the message window. Thus a user would typically be required to copy down by hand any information from an error message, which he or she would want to refer to at a later time. The software utility, of course, would have full functionality once the printer server and associated printer were correctly installed, however, at this time obtaining installation information would be less urgent.

SUMMARY OF THE INVENTION

In accordance with the preferred embodiment of the present invention, feedback is provided to a user during installation of electronic equipment. Prior to installation of the electronic equipment, a plurality of installation feedback lights are placed on a case of the electronic equipment. During installation of the electronic equipment after attempting performance of an installation step, a determination is made as to whether performance of the installation step was successful. When performance of the installation step was successful, notification is provided to an installer that the installation step was successful. The notification includes activating one of the installation feedback lights.

In the preferred embodiment of the present invention, when performance of the installation step was successful a success message is printed out which indicates the installation step was successful. The success message also provide any needed information for a next installation step.

When it is determined that performance of the installation step was not successful, notification that the installation step was successful is withheld from the installer. Additionally, an error message is printed out which indicates failure of the installation step and suggests possible actions to be taken by the installer to remedy the failure.

In the preferred embodiment, the installation feedback lights are activated, for example, by being turned on, by being blinked on and off, and/or by changing color. Also in the preferred embodiment, the installation step is a hardware step such as attaching a cable to the electronic equipment, or is a software configuration step, such as obtaining an internet protocol (IP) network address.

The present invention provides automated visual feedback during installation. This visual feedback offers useful information to the installer in the form of lights that are controlled by product firmware/software for each step of the hardware installation and software configuration. Light based visual feedback provides assurances to the installer that the last installation step was successful and increases the confidence of the installer to proceed to the next installation step. This enhanced confidence is critical to insure that new installers have a positive/successful experience when installing their first network print server.

The present invention also offers effective feedback through printed pages that confirm the successful completion of installation and configuration steps. Visual feedback from printed pages provides greater confidence to the installer that the last installation step was successfully completed and that the installer can now proceed to the next installation step.

The present invention also offers the automatic printing of a page that explains an error condition that the installation process encounters. A printed page outlining an error will be of additional use if the installer is required to contact a product support technician on the phone to resolve the error condition.

The present invention also facilitates automated visual feedback from printed pages that provide recommended troubleshooting instructions to assist the installer. The installation feedback lights can additionally be used for product maintenance. Installation feedback lights on electronic equipment that, for example, represent hardware cable connections and software configuration will provide valuable troubleshooting information to an installer when a network attached peripheral stops functioning.

Integration of manual, hardware, software, and status pages with the use of installation feedback lights, matching software messages, and matching status pages will increase the likelihood that an installer with have a successful installation experience.

DESCRIPTION OF THE PREFERRED EMBODIMENT

Figure 1:
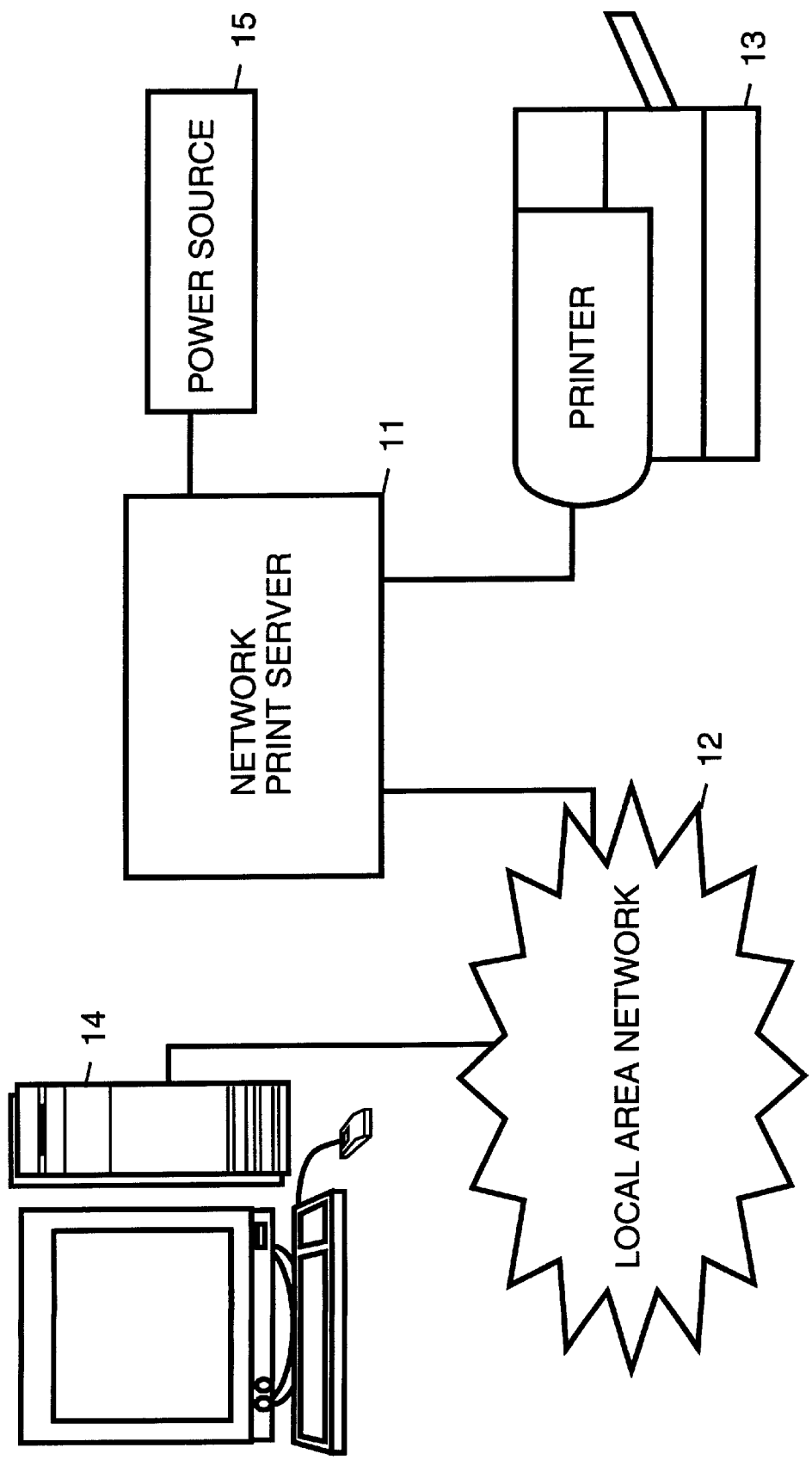
FIG. 1 is a block diagram which shows a network print server providing an interface between a local area network and a printer.

FIG. 1 is a block diagram which shows a network print server 11 providing an interface between a local area network 12 and a printer 13. A power source 15 provides power to network print server 11. A personal computer 14 through a local area network 12, communicates to network print server 11.

Network print server 11 includes extra features that aids installers in the installation and configuration of network print server 11.

The benefits of an easier installation process integrated with visual feedback is of greatest value to those installers who are installing and configuring a network print server for the first time. Benefits are also experienced by installers who do not perform network print server installations on a regular basis. As the installer follows each of the installation process steps outlined in a document, visual feedback is provided by lights on network print server 11 and messages printed by network print server 11 on printer 13. The lights provide status on the successful completion of both hardware/cable connections and software configurations. The pages printed by the network print server on the printer 12 also provide status on the same installation process steps. Additionally, the printed pages give expanded comments on the next step, troubleshooting steps that may be required to correct an error condition encountered during the installation and configuration process.

Figure 2:
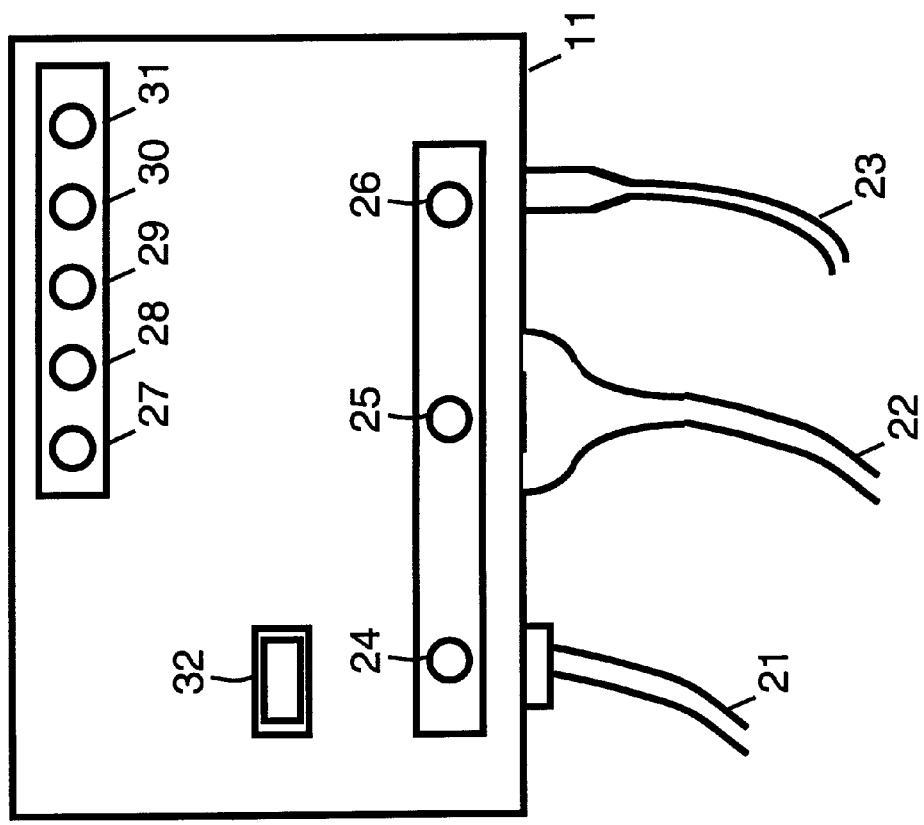
FIG. 2 is a simplified top view of a network print server in accordance with a preferred embodiment of the present invention.

FIG. 2 shows a simplified top view of network print server 11. A cable 21 connects network print server 11 to local area network 12. A cable 22 connects network print server 11 to printer 13. A power cable 23 connects network print server 11 to a power source.

Distributed with network print server 11 is documentation which describes the installation and configuration process. The steps described therein provide detail on the steps required for both hardware installation and software configuration (installation). The installation document is constructed in either a detailed manual format, a quick reference summary format, or an ultra-brief reference summary format which can be placed on the case of network print server 11. Alternatively, or in addition, network print server 11 can generate install documents by printing pages on printer 13.

A hardware installation light 24 is activated to indicate when network print server 11 is correctly attached to local area network 12. A hardware installation light 25 is activated to indicate when network print server 11 is correctly attached to printer 13. A hardware installation light 26 is activated to indicate when network print server 11 is correctly attached to a power source.

A software configuration light 27, a software configuration light 28, a software configuration light 29, a software configuration light 30 and a software configuration light 31 are individually activated to indicate the successful completion of software configuration steps.

Hardware installation lights 24 through 26 and software configuration lights 27 through 31 convey information by their states of on, off, or blinking. In addition, in some embodiments of the present invention, software configuration lights 27 through 31 also can display information through their color when software configuration lights 27 through 31 are configured to display more than one color.

While hardware installation lights 24 through 26 and software configuration lights 27 through 31 are implemented as lights, in alternative embodiments of the present invention, installation indicators are implemented using alphanumeric displays to provide feedback to an installer on the progress of the installation and configuration of network print server 11.

Network print server 11 also includes a switch to activate the printing of a status page. When activated the switch indicates to network print server 11 that the installer is requesting a print server status page. The status page indicates a variety of parameters relating to the status of network print server 11, including but not limited to a product number, a firmware revision number, LAN port selected, LAN hardware address, IP address, printer type, and network statistics. The status page button feature is similar to those currently implemented on network print servers available in the prior art.

A button 32 on network print server 11 activates the printing of installation assistance pages. When activated, button 32 indicates to network print server 11 that the installer is actively involved in installing and configuring network print server and is requesting a printed page that outlines the next logical installation configuration step to be completed. In the preferred embodiment of the present invention, button 32 is used to activate both status pages and installation assistance pages by defining the installation assistance pages as selected when the time that the button is pressed exceeds a preset value.

As further described below, network print server 11 is capable of initiating print jobs that contain information regarding status of the installation and configuration process. Additionally network print server 11 includes a special software utility program to aid in completing the software configuration. This special software utility program is similar to software utility programs available for prior art network print servers.

To install network print server 11, an installer reviews the reference install document, makes the hardware cable connections while observing status lights and status pages associated with the hardware installation, and performs software configuration while observing status lights and configuration status pages associated with software configuration.

The installation steps are set out in the reference install document which are referred to by the installer throughout the installation.

During hardware configuration, after referencing the installation document, the installer begins the sequential connection of multiple cables. For the network print server 11 the customer will connect three interfaces: local area network 12, a parallel port connection to printer 13 and a power interface.

Figure 3:
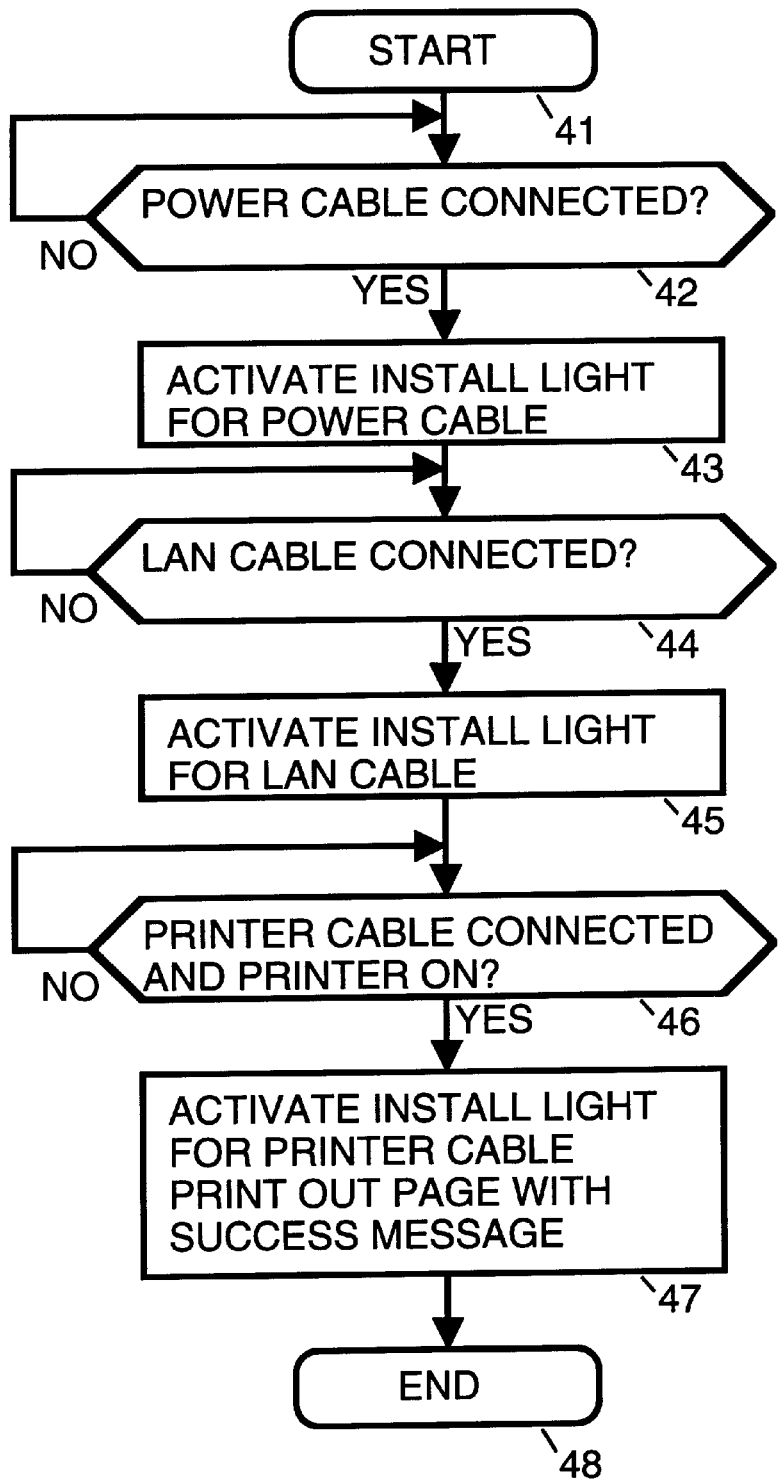
FIG. 3 is a simplified flowchart which describes provision of feedback during installation of hardware in accordance with a preferred embodiment of the present invention.

FIG. 3 is a simplified flowchart which describes provision of feedback during hardware installation in accordance with a preferred embodiment of the present invention. In a step 41, the hardware installation begins. In a step 42, network print server 11 detects whether power cable 23 is connected and power is delivered to network print server 11. If so, in a step 43, hardware installation light 26 is activated to indicate network print server 11 is correctly attached to a power source.

In a step 44, network print server 11 detects whether cable 21 is connected and network print server 11 is thus connected to local area network 12. If so, in a step 45, hardware installation light 24 is activated to indicate network print server 11 is correctly attached to local area network 12.

In a step 46, network print server 11 detects whether cable 22 is connected and network print server 11 is connected to printer 13 and if so, whether printer 13 is on. If cable 22 is connected and printer 13 is on, in a step 47, hardware installation light 25 is activated to indicate network print server 11 is correctly attached to printer 13. Additionally, network print server 11 prints a status page on printer 13 to give additional visual feedback/confirmation of the successful completion of hardware installation. In a step 48, hardware installation is complete.

The software configuration segment involved in setting up network print server 11 is accomplished with the use of a special software utility running on personal computer 14 (shown in FIG. 1), as is customary in the art. Tasks to be accomplished using the software configuration utility are dependent on the type of network operating system (NOS) chosen. This may include creating a one-to-one correspondence between a print queue on a networked server and the pair consisting of printer 13 and network print server 11 connected to local area network 12.

Using the preferred embodiment of the present invention, the installer finds that the successful completion of a software configuration operation outlined in the manual causes a corresponding software configuration light on network print server 11 to light up and a corresponding status page to be printed on printer 13. In the event an error is encountered, the software utility displays an error on the monitor of personal computer 14 connected to local area network 12, and network print server 11 also print a page containing text that describes the error encountered. In various embodiments of the present invention, messages are localized to foreign languages.

Figure 4:
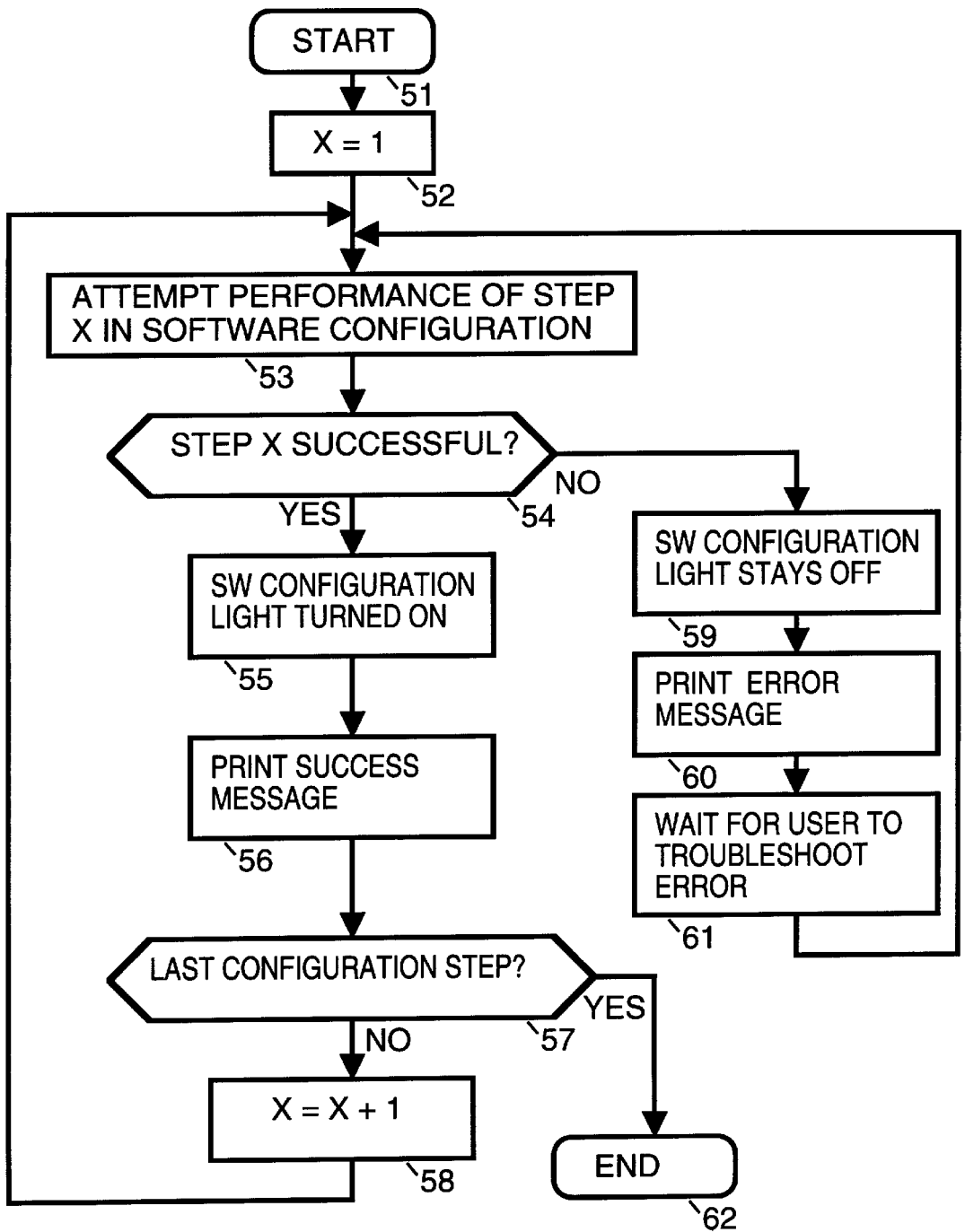
FIG. 4 is a simplified flowchart which describes provision of feedback during configuration of software in accordance with a preferred embodiment of the present invention.

FIG. 4 is a simplified flowchart which describes provision of feedback during configuration (installation) of software in accordance with a preferred embodiment of the present invention. In a step 51, the software configuration begins. In a step 52, a variable x, which represents the current software configuration step, is initialized to indicate the first step. In a step 53, performance of software configuration step x is attempted. For example, performance of step x is initiated by the software utility with or without input from the installer, depending upon the particular software configuration step.

In a step 54, network print server 11 determines whether software configuration step x was successful. If not, in a step 59, the software configuration light associated with software configuration step x remains de-activated. In a step 60, network print server 11 prints an error message on printer 13. The error message indicates the error and suggests possible actions to be taken by the installer to remedy the error. In a step 61, network print server 11 waits for the user to trouble shoot the error. When trouble shooting is completed, network print server 11 returns to step 53 and the installer re-attempts software configuration step x.

If in step 54, network print server 11 determines software configuration step x was successful, in a step 55, network print server 11 activates the software configuration light associated with software configuration step x. In a step 56, network print server 11 prints an success message on printer 13 indicating the performance of software configuration step x was successful and providing additional information on performance of the next installation step.

In a step 57, network print server 11 determines whether software configuration step x is the last installation step. If so, in a step 62 installation is completed.

If in a step 57, network print server 11 determines software configuration step x is not the last installation step, in a step 58, x is incremented to indicate the next installation step is to be performed. Then network print server 11 returns to step 53 in order to attempt to perform next software configuration step x.

For example, in a typical installation, during the first software configuration step, a software self-test is performed for operation between network print server 11 and printer 13. During the second software configuration step, network print server 11 receives an IP address from local area network 12. During the third software configuration step, network print server 11 configures itself using the received IP address. During the fourth software configuration step, network print server 11 confirms the received IP address is valid. During the fifth software configuration step, network print server 11 confirms that network print server 11 is connected to a print queue resident on a server configured personal computer residing on local area network 12. During the sixth software configuration step, network print server 11 receives a test print job which is printed out on printer 13.

While the discussion of the preferred embodiment has dealt specifically with a network server for printers, the principles set out herein are useful when the network server is used for a copier, a scanner, a CD ROM, a combination printer/scanner/copier or other peripheral devices, with the exception, however, that for peripherals without printing capability, printing is performed on separate printer attached to the local area network. Additionally, most features of the present invention are also applicable to set-up and configuration of electrical equipment that is not attached to a local area network.

The foregoing discussion discloses and describes merely exemplary methods and embodiments of the present invention. As will be understood by those familiar with the art, the invention may be embodied in other specific forms without departing from the spirit or essential characteristics thereof Accordingly, the disclosure of the present invention is intended to be illustrative, but not limiting, of the scope of the invention, which is set forth in the following claims.

I claim:

1. A method for providing feedback to a user during installation of electronic equipment comprising the following steps:

(a) prior to installation of the electronic equipment, placing on a case of the electronic equipment, a plurality of installation feedback lights; and (b) during installation of the electronic equipment performing the following substeps which are repeated for each installation step:
  (b.1) monitoring performance of an installation step,
  (b.2) determining whether performance of the installation step was successful, and
  (b.3) when in substep (b.2) it is determined that performance of the installation step was successful, providing notification to an installer that the installation step was successful, including printing out a success message which indicates the installation step was successful and providing any needed information for a next installation step.

2. A method as in claim 1 wherein substep (b.3) includes activating one of the installation feedback lights when in substep (b.2) it is determined that performance of the installation step was successful.

3. A method as in claim 1 wherein step (b) additionally includes the following substep:
  (b.4) when in substep (b.2) it is determined that performance of the installation step was not successful, withholding from the installer notification that the installation step was successful.

4. A method as in claim 3 wherein substep (b.4) includes printing out an error message which indicates failure of the installation step and suggests possible actions to be taken by the installer to remedy the failure when in substep (b.2) it is determined that performance of the installation step was not successful.

5. A method as in claim 2 wherein in substep (b.3) the installation feedback lights are activated by being turned on.

6. A method as in claim 2 wherein in substep (b.3) the installation feedback lights are activated by being blinked on and off.

7. A method as in claim 2 wherein in substep (b.3) the installation feedback lights are activated by changing color.

8. A method as in claim 1 wherein in step (a) the electronic equipment is a network print server.

9. A method as in claim 1 wherein in substep (b.1) the installation step includes attaching a cable to the electronic equipment.

10. A method as in claim 2 wherein in step (a) the electronic equipment is a network print server and in substep (b.1) the software configuration step includes obtaining an internet protocol network address.

11. A device for providing feedback to a user during installation of electronic equipment, the apparatus comprising:
  monitoring means for, during installation of the electronic equipment, determining whether performance of an installation step was successful; and
  feedback means for, when the installation step was successful, providing notification to an installer that the installation step was successful, including printing out a success message which indicates the installation step was successful and providing any needed information for a next installation step.

12. A device as in claim 11 wherein the feedback means activates one of a plurality of installation feedback lights when the feedback means determines that performance of the installation step was successful.

13. A device as in claim 11 wherein when the feedback means determines that performance of the installation step was not successful, the feedback means withholds from the installer notification that the installation step was successful.

14. A device as in claim 13 wherein the feedback means prints out an error message which indicates failure of the installation step and suggests possible actions to be taken by the installer to remedy the failure when the feedback means determines that performance of the installation step was not successful.

15. A device as in claim 12 wherein the feedback means activates an installation feedback light by turning the installation feedback light on.

16. A device as in claim 12 wherein the feedback means activates an installation feedback light by blinking the installation feedback light on and off.

17. A device as in claim 12 wherein the feedback means activates an installation feedback light by changing color or the installation feedback light.

18. A device as in claim 11 wherein the installation step includes attaching a cable to the electronic equipment.

19. A method for providing feedback to a user during installation of electronic equipment comprising the following steps:
  (a) prior to installation of the electronic equipment, placing on a case of the electronic equipment, a plurality of installation feedback lights; and
  (b) during installation of the electronic equipment performing the following substeps which are repeated for each installation step:
    (b.1) monitoring performance of a software configuration step,
    (b.2) determining whether performance of the software configuration step was successful, and
    (b.3) when in substep (b.2) it is determined that performance of the software configuration step was successful, providing notification to an installer that the software configuration step was successful, including activating one of the installation feedback lights.

20. A device for providing feedback to a user during installation of electronic equipment, the apparatus comprising:
  a plurality of installation feedback lights placed on a case of the electronic equipment;
  monitoring means for, during installation of the electronic equipment, determining whether performance of an software configuration step was successful; and,
  feedback means for, when the software configuration step was successful, providing notification to an installer that the software configuration step was successful, including activating one of the installation feedback lights.

21. A device as in claim 20 wherein the electronic equipment is a network print server and the software configuration step includes obtaining an internet protocol network address.

* * * * *